Nov. 17, 1964 W. L. JEWETT 3,157,113
MACHINE ACTUATING MEANS
Filed April 14, 1964 5 Sheets-Sheet 2

INVENTOR.
WALTER L. JEWETT
BY
ATTORNEY

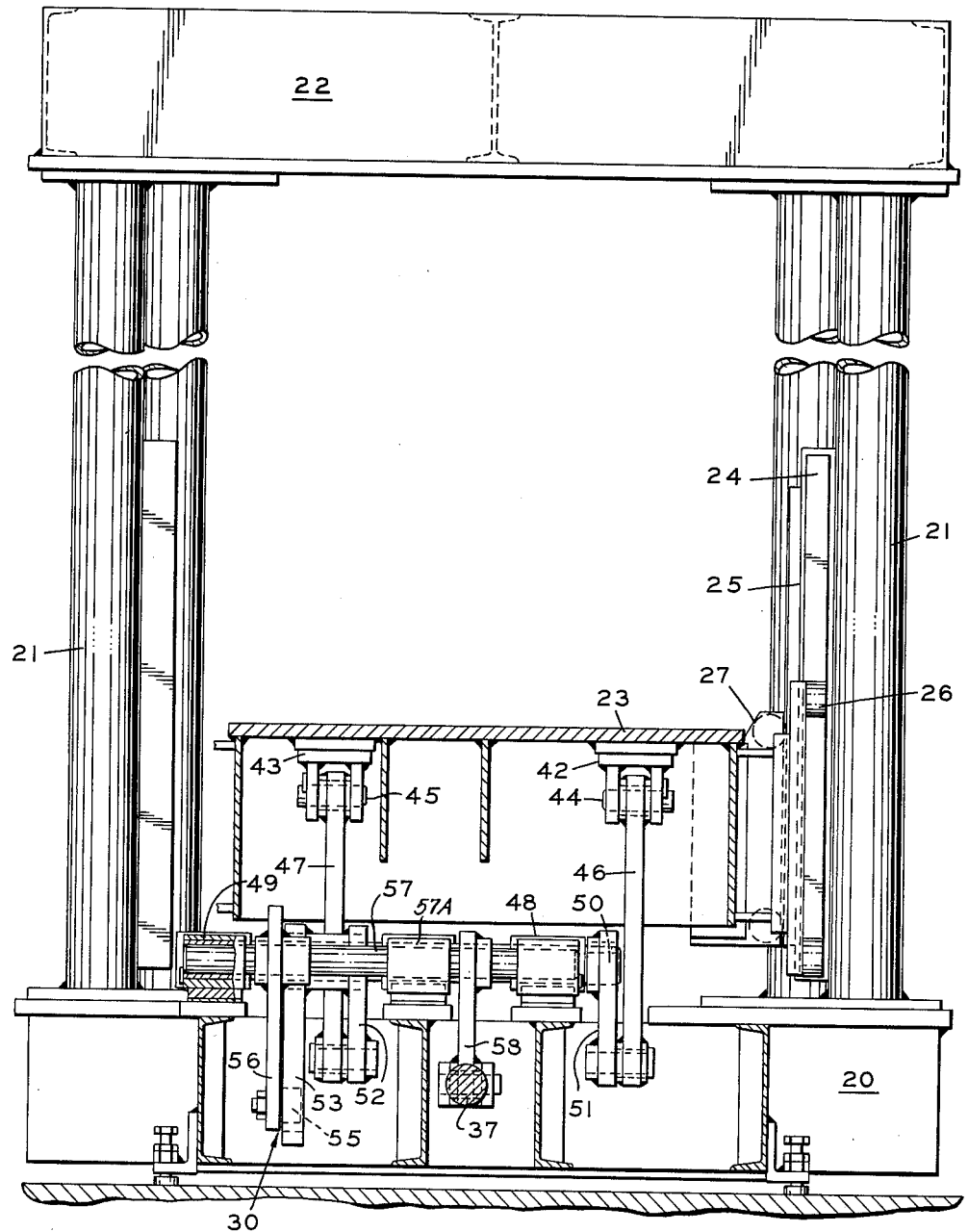

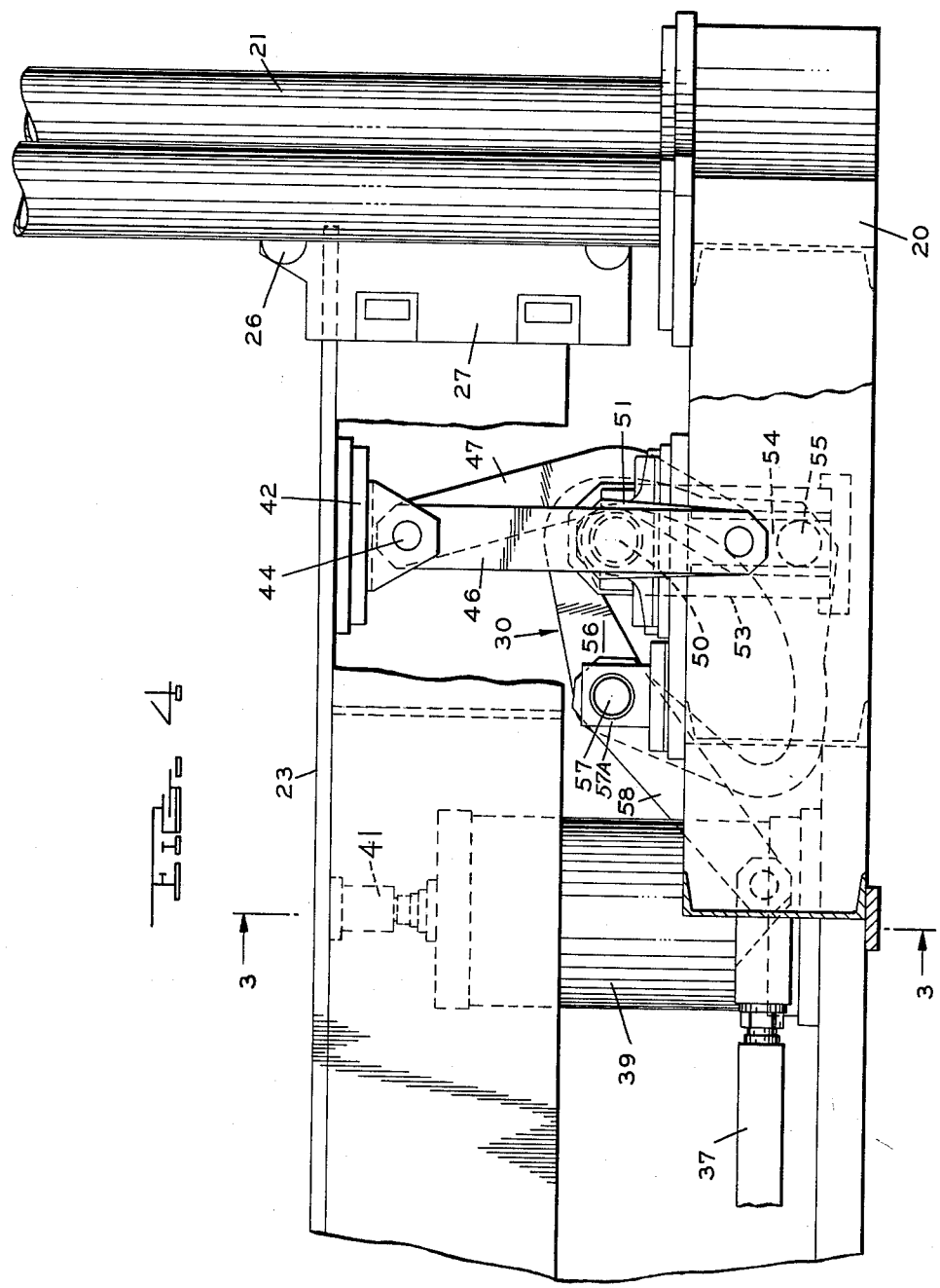

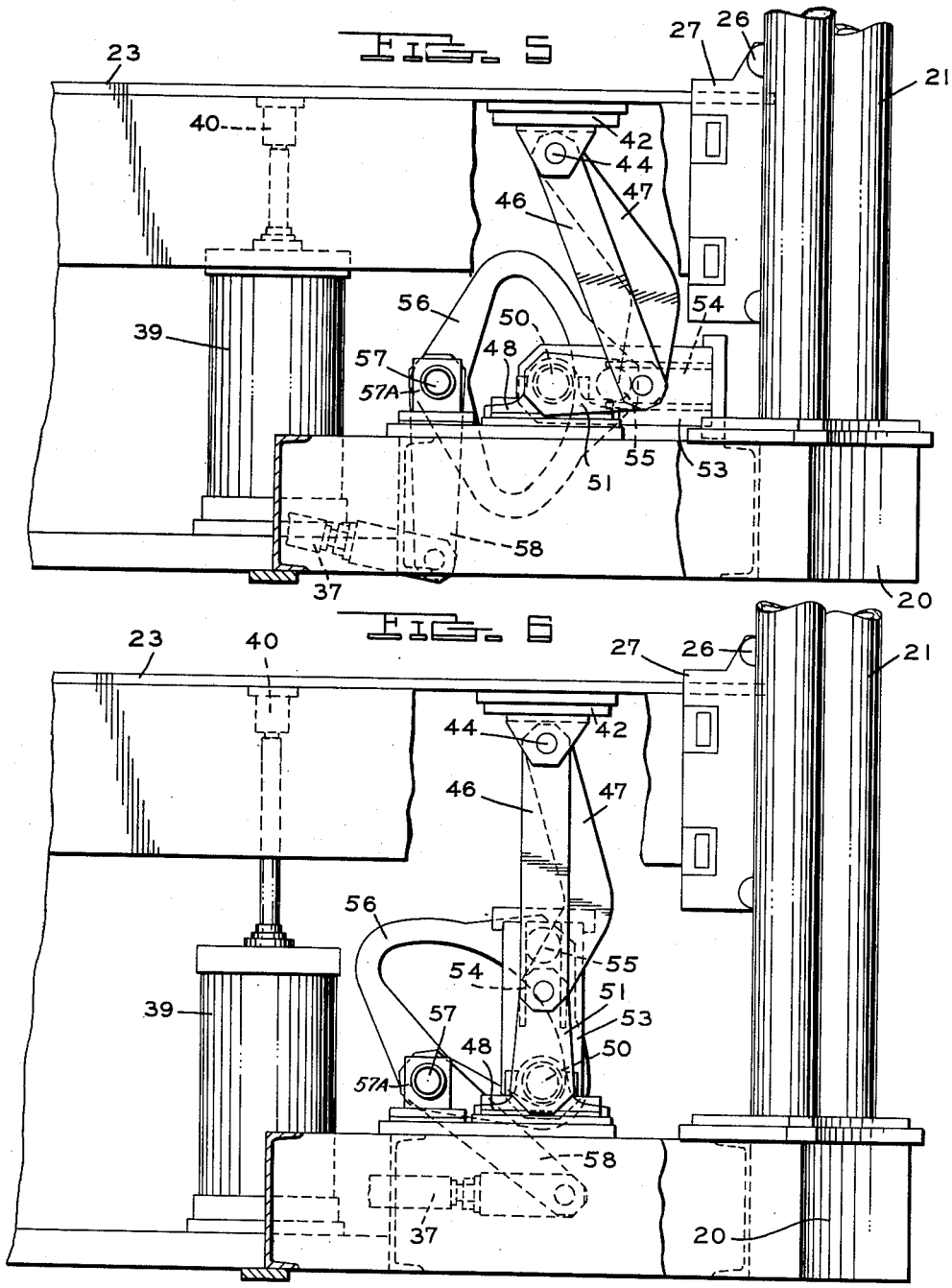

3,157,113
MACHINE ACTUATING MEANS
Walter L. Jewett, Royal Oak, Mich., assignor to Allied Welder Corporation, Detroit, Mich., a corporation of Michigan
Filed Apr. 14, 1964, Ser. No. 359,630
3 Claims. (Cl. 100—272)

This invention relates to a machine having an extremely long platen reciprocated by multiple sets of harmonic motion actuating means inter-connected together to synchronously move the platen with equal force and motion from end to end.

The machine has a base with stanchions rising from the base to a head. The head constitutes a stationary platen. The stanchions inter-connect the base and head. The harmonic motion actuating means are positioned on the base. The movable platen lies between the base and head and is connected to the harmonic motion actuating means. Side and end rollers on the movable platen ride against guide rails on the stanchions preventing side and end motion of the platen in its up and down travel. Counter-balancing air cylinders are positioned on the base and bear against the movable platen and are adjusted as to size and pressure to substantially floatingly support the movable platen and the weight of equipment carried by the movable platen including workpieces.

The harmonic motion actuating means on the base connected to the movable platen are disposed in like sets at either end of the platen and in the central portion of the platen. This is by way of example. Obviously one or more sets of harmonic motion means may be located between the base and the movable platen as desired depending on its length, desired power, and load concentrations. The power source for actuating the harmonic motion means may be of any type, however, air cylinders have been found very advantageous. One or more air cylinders may be used to power the harmonic motion actuating means. The various sets of harmonic motion actuating means are inter-connected by links so that their motion and travel are identical. Thus one or more air cylinders may be used to power the linkage without any difference occurring in the travel of the platen.

Obviously a machine having a long platen such as 17 feet can be used advantageously to make long parts such as deep-freeze liners and other long items which must be formed in one piece such as with vacuum or blow molding. However, it has been found advantageous to use the long platen as a unitary base for progressive fabricating operations in manufacturing.

Small progressive dies are well known. They may be used in an ordinary press. They have progressive stations which advance a strip of material from raw metal to finished part through progressive operations by advancing a partially formed part from station to station until completely formed. Such a dye may be 24 inches long and can be placed in an ordinary press and operated.

However, there are other types of progressive manufacture such as in the assembly and finishing of workpieces like stove or range doors. With the platen press of the invention containing various progressive stage dies, tools, welders, fixtures and equipment for completely fabricating the door, the component parts may be inserted at one end and at stations along the sides with the parts at various stages being worked upon when the press closes and advanced when the press opens together with initial loading and final ejection of the finished part in the open position. Thus four to six progressive stations may be established on the movable platen and automatic loading and unloading means associated with the movement of the platen together with automatic transfer means which move the workpieces progressively from station to station each time the press opens and closes.

Obviously smooth positive equal motion of the platen from end to end and from side to side is essential in such operations. It can also be understood that in performing work on several progressively fabricated workpieces that a substantial amount of force is required. It will also be understood that smooth acceleration and deceleration together with smooth non-vibratory travel is essential to the proper operating of the equipment so that the automatic loading, unloading, transfer, forming, clinching, and welding means operate properly and without unnecessary shocks and strains thus keeping the parts properly positioned at all times and permitting all the accessory equipment to operate timely and smoothly in various cycles of the various operations.

With the foregoing in view it is a primary object of the invention to provide an extremely long platen press such as up to 17 feet and longer which moves smoothly and without vibration between its open and shut positions and which has equal movement from end to end and side to side.

An object of the invention is to provide sets of harmonic motion means on the base of the press connected to the movable platen so that motion and force is applied to the movable platen at its ends and at various points between its ends to insure an equal application of force and motion to the entire movable platen.

An object of the invention is to provide counter-balancing air cylinders between the base and movable platen which floatingly support the movable platen and the weight of equipment and parts thereon to leave the sets of harmonic motion actuating means free from the dead weight load of the parts and equipment as well as the movable platen so that the force and motion exerted by the harmonic motion actuating means can be utilized wholly in the work done in fabricating the workpieces.

An object of the invention is to provide a crank shaft pivotally mounted on the base connected to the movable platen by a connecting rod.

An object of the invention is to provide a torque arm having a cam slot on the crank shaft for rotating the crank shaft 180° to swing the crank shaft and connecting rod to reciprocate the movable platen.

An object of the invention is to provide a cam lever pivotally fulcrumed on the side of the crank shaft opposite to the throw of the torque arm extending past the crank shaft and having a cam in the cam slot of the torque arm so that swinging movement of the cam lever arm and cam relative to the torque arm cam slot causes rotational movement of the torque arm, crank shaft, and reciprocating movement of the connecting rods and platen.

An object of the invention is to provide inter-connecting linkage between the cam levers of the various sets of harmonic motion actuating means actuated by power means which may be an air cylinder or a plurality of air cylinders.

An object of the invention is to utilize the harmonic motion of the crank in smoothly accelerating and decelerating reciprocating movement of the movable platen.

An object of the invention is to utilize the harmonic motion of the cam and cam track in conjunction with the harmonic motion of the crank and connecting rod to further incorporate smooth acceleration and deceleration in the reciprocating movement of the movable platen.

An object of the invention is to coordinate the motion of the cam and cam track with the motion of the crank and connecting rod that they accelerate and decelerate together, thereby moving the movable platen as a result of the combined or double harmonic motion.

These and other objects of the invention will become apparent by reference to the following description of the exemplary extremely long platen harmonically actuated press embodying the invention taken in connection with the accompanying drawings in which:

FIG. 3 is a greatly enlarged end elevational view partly in cross-section of the device seen in FIG. 1 taken from the right end thereof additionally showing the head portion of the press with parts broken away to show the internal construction.

FIG. 4 is a partial side elevational view of the device seen in FIG. 3 showing the right end of the press as seen in FIG. 1 in more detail with parts broken away to show the internal construction.

FIG. 5 is a reduced view similar to FIG. 4 showing the platen raised to the halfway point; and FIG. 6 is a view similar to FIG. 5 showing the platen fully raised.

Figure 1:
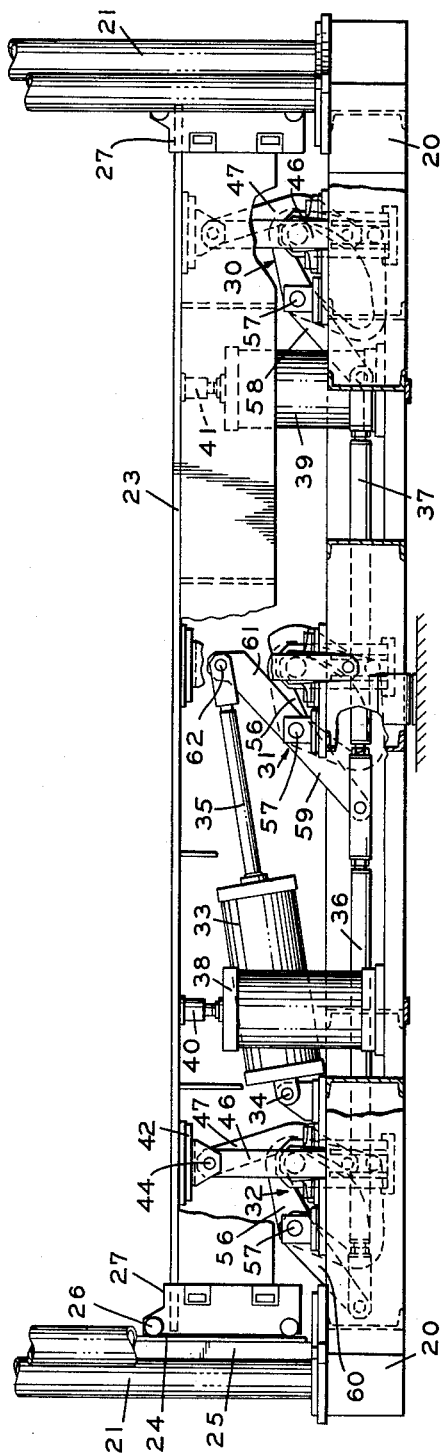
FIG. 1 is a side elevation view of a press embodying the invention with the stanchions broken away, the head removed, and portions of the parts broken away showing the internal construction in more detail.
Figure 2:
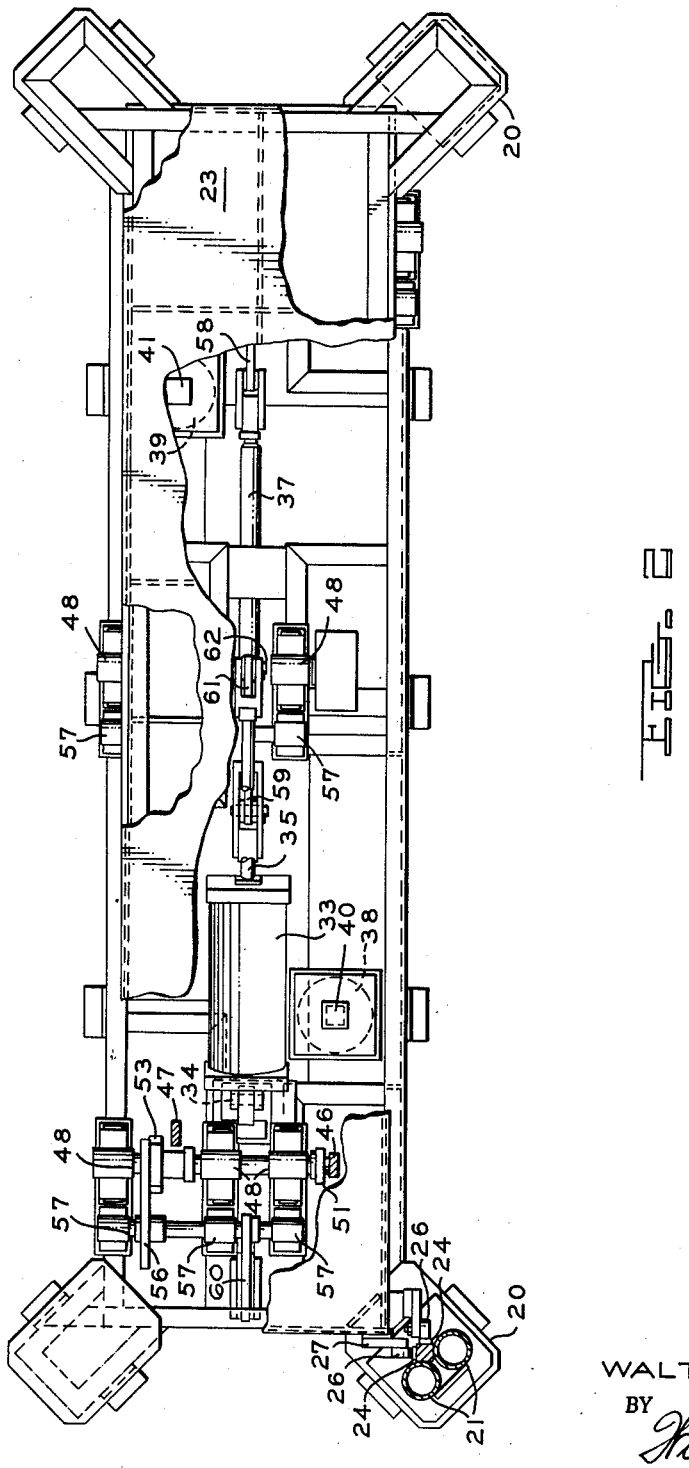
FIG. 2 is a top plan view of the device seen in FIG. 1 with parts broken away showing the internal construction.

Referring now to the drawings wherein like numerals refer to like and corresponding parts throughout the several views, the extremely long harmonically operated fast acting platen press disclosed therein to illustrate the invention comprises, a base 20 having stanchions 21 at its four corners supporting a head 22 in spaced relationship above the base 20. A movable platen 23 lies above the base 20 and below the head 22 within the confines of the stanchions 21. Each stanchion 21 has a longitudinal guide rail 24 and a lateral guide rail 25. The platen 23 is equipped at each corner with the longitudinal guide roller assembly 26 in contact with the guide rail 24 on each stanchion and a lateral guide roller assembly 27 in contact with the lateral rail 25 on each stanchion. The stanchions 21 and guide rails 24 and 25 at the four corners of the platen 23 channel up and down vertical movement of the platen 23 preventing end and side movement.

Three sets of harmonic motion actuating means are located on the base 20 below the platen 23; they are designated with the reference numerals 30, 31, and 32. An air cylinder 33 is pivotally connected to the base at 34 and has a piston rod 35 pivotally connected to the harmonic motion means 31. The applied force of the air cylinder 33 to the harmonic motion means 31 is transferred to the harmonic motion means 32 by the connecting link 36 and to the harmonic motion means 30 by the connecting link 37. This linkage transfers equal motion between each of the harmonic motion means 30, 31, and 32.

Dead weight counter-balancing air cylinders 38 and 39 rest on the base 20 and are equipped with piston rods 40 and 41 respectively which bear against the platen 23. The size and operating pressure of the counter-balancing air cylinders 38 and 39 is coordinated and adjusted relative to the dead weight of the movable platen 23, the equipment, workpieces, and the portions of the harmonic motion means connected thereto. This substantially positions the movable platen 23 in a relatively floating condition so that the motion and force exerted by the harmonic motion means 30, 31, and 32 may be utilized substantially entirely for working fabricating workpieces.

The sets of harmonic motion actuating means are substantially identical. The means 30 will be described particularly as exemplary of the other harmonic motion actuating means 31 and 32.

Referring now to FIGS. 4 and 5, the harmonic motion means 30 comprises paired clevises 42 and 43 welded on the platent 23. Each clevis 42 and 43 carries a pivot pin 44 and 45 respectively. A connecting rod 46 is pivoted on the pin 44. A connecting rod 47 is pivoted on the pin 45. Bearings 48 and 49 are mounted on the base 20 and rotatably position a crank shaft 50 having a crank 51 pivotally connected to the connecting rod 46 and a crank 52 pivotally connected to the connecting rod 47. The cranks 51 and 52 are shown in the downwardly extending position in FIGS. 3 and 4 which lowers the connecting rods 46 and 47 and the platen 23 to its open position. Rotational movement of the crank shaft 50 through 180° positions the cranks 51 and 52 through the position of FIG. 5 to their up position as seen in FIG. 6 raising the connecting rods 46 and 47 and the platen 23 to the top or closed position.

Rotational movement of the crank shaft 50 occurs as follows. A torque arm 53 is welded on the crank shaft 50. The torque arm 53 has a cam track 54 lying radially of the crank shaft 50. A cam 55 lies in the cam track 54 of the torque arm 53. The cam 55 is mounted on a cam lever 56. The cam lever 56 is pivotally mounted on a shaft 57 in a bearing block 57A at a point spaced from the crank shaft 50. The torque arm 53 is adapted to swing back and forth in 180° of angular movement on one side of the crank shaft 50. The bearing block 57A and shaft 57 pivotal mount of the cam lever 56 is positioned on the other side of the crank shaft 50 from the angular swing of the torque arm 53.

It is to be noted that the radius on which the cam lever 56 on shaft 57 swings the cam 55 radially of the bearing block 57A is much greater than the largest radial distance of the cam 55 relative to the crank shaft 50 as it swings and slides in the cam track 54 of the torque arm 53. Due to this difference in radial length, a relatively small angular movement of the cam lever 56, such as 90°, produces a relatively larger angular movement in the torque arm 53, such as 180°. This is accomplished by the cam sliding in the cam track 54 of the torque arm 53 as it moves from the position of FIG. 4 through the position of FIG. 5 to the position of FIG. 6 and return. Here it can be seen that the 90° angular movement of the cam lever 56 relative to the torque arm 53 produces 180° of angular movement in the torque arm 53 and the crank shaft 50 to swing the cranks 51 and 52 through 180° of angular movement.

Cam lever 56 and power lever 58 are mounted on shaft 57. Motion and power is imparted to the cam lever 56 by the power lever 58 which is connected to the cam lever 56 and to the power link 37. The other end of the link 37 is connected to the power lever 59 of the harmonic motion means 31. The power lever 59 is also connected to one end of the power link 36. The other end of the power link 36 is connected to the power lever 60 of the harmonic motion means 32. The power lever 59 of the harmonic motion means 31 has a take off lever extension 61 which is pivotally connected as at 62 to the piston rod 35 of the air cylinder 33.

In operation, when air under pressure is fed to the air cylinder 33, the piston rod 35 is retracted swinging the lever extension 61 toward the air cylinder 33 or to the left as seen in FIG. 1. This causes the power lever 59 on the other side of the pivot point of the bearing block 57A to swing away from the air cylinder 33 or to the right as seen in FIG. 1. The swinging movement of the levers 61 and 59 of the harmonic motion means 31 directly imparts swinging motion to the cam lever 56 of the harmonic motion means 31 in the center of the press. The swinging motion of the power lever 59 is transmitted to the power lever 60 at the means 32 by the link 36 and is transmitted to the power lever 58 of the means 30 by the link 37. Swinging movement of the power lever 60 is transferred to the cam lever 56 of the harmonic motion means 32 and the swinging motion of the power lever 58 is transmitted to the cam lever 56 of the harmonic motion means 30. Thus the cam levers 56 of the harmonic motion means 30, 31, and 32 move at the same time at equal speeds and travel equal distances thereby swinging their respective cams 55 at the same time, at the same speed, and equal distance.

The cams 55 of the harmonic motion means 30, 31, and 32 impart motion at the same time, at equal speed, for equal distance to the torque arms 53 so as to impart equal motion and speed at the same time to the torque arms 53.

The equal angular movement of the torque arms 53 move their respective crank shafts 50 at the same time, at the same speed, and with equal angular motion. Thus the respective crank shafts 50 of the harmonic motion means 30, 31, and 32 rotate at the same time, speed, and amplitude. Thus the cranks 51, and 52 on each crank shaft 50 swing at the same time, at equal speed, and with equal amplitude in each of the harmonic motion means 30, 31, and 32.

As a result of the equal angular movement of the cranks 51 and 52 at the same time with the same amplitude in each of harmonic motion means 30, 31, and 32, the respective connecting rods 46 and 47 impart motion to the ends and center of the platen 23 at the same time, at the same speed, and with the same amplitude.

It will be noted that the cranks 51 and 52 and connecting rods 46 and 47 are on dead center in the open position of the platen 23, as seen in FIGS. 3–4 and in the closed position of the platen as seen in FIG. 6. This establishes the travel limits of the platen 23 at its up and down position. The cranks 51 and 52 therefore apply full harmonic acceleration and deceleration at both ends of travel of the platen 23 and furnish maximum speed of motion intermediate their dead center relationships with the connecting rods 46 and 47. Their full harmonic motion is coordinated with the harmonic motion of the cams 55 relative to the torque arm 53. The harmonic motion of the cam 55 relative to the torque arm 53 is substantially full harmonic motion as each cam 55 is moving substantially radially out of the cam track 54 of the torque arm 53 at either end of the torque arm 53 180° movement.

In this connection, the harmonic motion of the cam in the cam track 54 of the torque arm 53 is coordinated relative to the harmonic motion of the connecting rods 46–47 to the cranks 51–52 as to be additive relative to acceleration and deceleration and maximum speed intermediate ends of travel.

Thus the maximum force of the cam and torque arm adjacent the ends of travel is additive to the maximum force of the cranks 50–52 with the connecting rods 46–47 adjacent the ends of travel to produce cumulative mechanical advantage. Conversely, the maximum speed of motion of the cam 55 relative to the torque arm 53 intermediate the ends of travel is cumulative to the speed of motion between the cranks 51–52 and the connecting rods 46–47 intermediate the ends of travel to provide and produce very high speeds intermediate the ends of travel.

Thus the platen 23 is moved very slowly with maximum force adjacent the ends of travel and very quickly with minimum force intermediate the ends of travel. Also the platen is moved with very slow acceleration and very slow deceleration adjacent the ends of travel with smooth transition to maximum speeds intermediate the ends of travel. With this maximum speed and maximum force relationship, the platen 23 moves smoothly between its open and closed positions and returns with what appears to be almost instantaneous movement. In other words, the combined acceleration and deceleration of the harmonic means is applied so smoothly that the platen appears to jump from the open to the closed position and to jump back from the closed position to the open position. However, no jump or sudden motion occurs as the transition is so smooth that coins balanced on their edge on the platen will move repeatedly between the up and down position without being disturbed in spite of the apparent instantaneous movement.

While one power cylinder 33 has been shown and described in detail, it is obvious that additional power cylinders 33 may be utilized such as one for each harmonic motion means 30, 31, and 32 or two cylinders applied to the end means with one at each end and their power transferred to the center motion means by the links 36 and 37. Obviously the platen 23 and press may be made much longer with additional units integrated beneath it and the base 20 and, for all practical purposes, the press may be made two or three times as long as shown with stanchions 21 intermediate the length of the press as well as at the ends. Also additional counter-balancing air cylinders 39 and 38 may be positioned beneath the press to give it floating support for dead weight at various points as desired. Obviously a single harmonic actuating means and a shorter platen may be used.

While air power has been shown as suitable it is also within the purview of the invention to employ hydraulic cylinders or mechanical gearing operated by suitable power.

The novel press with the features described constitutes a compact, durable, neat-appearing, completely clean, vibrationless, and fast-acting power press which in the embodiment illustrated develops twenty thousand pounds of force on eighty pounds per square inch air pressure in the air cylinder 33.

Although but a single embodiment of the invention has been shown and described in detail, it is obvious that many changes may be made in the size, shape, detail, and arrangement and disposition of the various elements of the invention within the scope of the appended claims.

I claim:

1. A machine having harmonic motion actuating means converting relatively small cam lever angular movement to relatively large shaft angular movement comprising
    a shaft,
    a torque arm on said shaft having a cam track extending radially of said shaft on a relatively short radius; said torque arm swinging back and forth in an arc of 180° on one side of said shaft between positions above and below said shaft;
    a fulcrum pivot on the other side of said shaft relative to said arc described by said torque arm on said shaft,
    a cam lever having one end pivoted on said fulcrum point; said cam lever having an end extending from said fulcrum point on a relatively long radius past said shaft to the side of said shaft opposite to said fulcrum point so as to swing through said arc described by said torque arm,
    a cam on said extending end of said lever lying in said cam track of said torque arm;
    said cam lever swinging in an angular arc of 90° through said torque arm relatively large angular arc so as to intersect said torque arm arc at points above and below said shaft; and
    means for swinging said cam lever and cam back and forth through said torque arm arc; said cam harmonically camming said torque arm back and forth in its angular movement between substantially null positions at the ends of cam and cam track travel above and below said shaft with smoothly accelerated and decelerated speed between said null positions.

2. In a machine as set forth in claim 1,
    a crank on said shaft,
    a connecting rod pivotally connected on said crank, and
    a reciprocably movable platen pivotally connected to said connecting rod;
    said crank and connecting rod reciprocating said platen with harmonic motion with shaft rotation in conjunction with the harmonic motion of said shaft as rotated by said cam and cam track.

3. A machine having harmonic motion actuating means wherein relatively small cam lever angular movement is converted to relatively large crank shaft angular movement comprising,
    a platen,
    a crank shaft spaced from said platen having a crank, a connecting rod pivotally connected between said crank and said platen;
rotation of said crank shaft through 180° moving said platen between open and closed positions with harmonic motion;
a torque arm on said crank shaft adapted to swing said crank shaft in an arc of 180°;
said torque arm having a cam track lying radially of said crank shaft of relatively short radius;
said torque arm swinging back and forth in an arc on one side of said crank shaft;
a cam lever pivotally fulcrumed at a point spaced from said crank shaft on the side of said crank shaft opposite to and outside of said arc described by said torque arm,
a cam on said cam lever lying in said torque arm cam track;
said cam on said cam lever being spaced widely from said lever fulcrum point defining a relatively long radius;
said cam lever swinging said cam in an arc of 90° on said relatively long radius through said relatively large angular arc of short radius described by said torque arm on said crank shaft; and
power means connected to said cam lever for swinging said cam lever to move said cam relative to said cam track harmonically to rotate said shaft to swing said crank with harmonic movement relative to said connecting rod.

References Cited by the Examiner
UNITED STATES PATENTS

| | | | |
|---|---|---|---|
| 153,289 | 7/74 | Walker | 100—271 |
| 2,224,968 | 12/40 | Klocke | 100—271 X |
| 3,140,654 | 7/64 | Jewett | 100—272 X |

FOREIGN PATENTS

| | | |
|---|---|---|
| 531,549 | 1/22 | France. |
| 541,326 | 7/22 | France. |

WALTER A. SCHEEL, *Primary Examiner.*